US011138862B2

(12) United States Patent
VanBlon et al.

(10) Patent No.: US 11,138,862 B2
(45) Date of Patent: Oct. 5, 2021

(54) SYSTEMS AND METHODS TO ELECTRONICALLY INDICATE WHETHER CONFERENCE ROOM IS IN USE BASED ON SENSOR INPUT (71) Applicant: Lenovo (Singapore) Pte. Ltd., Singapore (SG)

(72) Inventors: Russell Speight VanBlon, Raleigh, NC (US); Axel Ramirez Flores, Cary, NC (US); Rodrigo Felix de Almeida, Raleigh, NC (US); Jonathan Jen-Wei Yu, Raleigh, NC (US); Jonathan Co Lee, Cary, NC (US); James A. Hunt, Chapel Hill, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 16/369,464

(22) Filed: Mar. 29, 2019

(65) Prior Publication Data
US 2020/0312120 A1    Oct. 1, 2020

(51) Int. Cl.
*G08B 21/22*    (2006.01)
*G01V 8/10*    (2006.01)

(52) U.S. Cl.
CPC .............. *G08B 21/22* (2013.01); *G01V 8/10* (2013.01)

(58) Field of Classification Search
CPC ....................................................... G08B 21/22
See application file for complete search history.

(56) References Cited

U.S. PATENT DOCUMENTS

| 5,050,077 | A | | 9/1991 | Vincent |
| 5,309,146 | A | * | 5/1994 | Kenet ................... G08B 19/005 |
| | | | | 340/540 |
| 7,400,229 | B2 | | 7/2008 | Boss et al. |
| 7,830,824 | B2 | | 11/2010 | Decker et al. |
| 7,974,849 | B1 | | 7/2011 | Begole et al. |
| 8,015,049 | B1 | | 9/2011 | Tam et al. |
| 8,195,203 | B1 | | 6/2012 | Tseng |
| 8,273,019 | B2 | | 9/2012 | Crowley et al. |
| 8,352,303 | B2 | | 1/2013 | Lehmann et al. |
| 8,644,473 | B1 | | 2/2014 | Bardwell et al. |
| 8,896,651 | B2 | * | 11/2014 | Chu ..................... H04L 12/1827 |
| | | | | 348/14.02 |
| 9,258,678 | B2 | | 2/2016 | Burgett et al. |
| 9,864,778 | B1 | | 1/2018 | Strand et al. |
| 9,978,043 | B2 | | 5/2018 | Jon et al. |

(Continued)

OTHER PUBLICATIONS

Ramirez Flores et al., "Systems and Methods to Extend Meetings Indicated in Electronic Calendars", file history of related U.S. Appl. No. 16/370,294, filed Mar. 29, 2019.

(Continued)

*Primary Examiner* — Qutbuddin Ghulamali
(74) *Attorney, Agent, or Firm* — John M. Rogitz; John L. Rogitz (57) ABSTRACT In one aspect, a first device includes at least one processor and storage accessible to the at least one processor. The storage includes instructions executable by the at least one processor to determine, based on input from at least one sensor, whether a conference room is in use. The instructions are also executable to, based on the determination, provide an electronic notification to a second device regarding whether the conference room is in use.

20 Claims, 9 Drawing Sheets

(56) References Cited

U.S. PATENT DOCUMENTS

| | | |
|---|---|---|
| 2003/0036941 A1 | 2/2003 | Leska et al. |
| 2005/0227676 A1 | 10/2005 | Vries |
| 2006/0015376 A1 | 1/2006 | Sattler et al. |
| 2006/0203620 A1 | 9/2006 | Bedingfield |
| 2007/0162315 A1 | 7/2007 | Hodges |
| 2008/0079569 A1* | 4/2008 | Axelsen ............... G06Q 10/10 340/541 |
| 2008/0147793 A1 | 6/2008 | Singh et al. |
| 2008/0162198 A1 | 7/2008 | Jabbour et al. |
| 2009/0149166 A1 | 6/2009 | Habib et al. |
| 2009/0315678 A1 | 12/2009 | Padmanabhan et al. |
| 2010/0085842 A1 | 4/2010 | Lazaridis et al. |
| 2010/0091615 A1 | 4/2010 | Scott et al. |
| 2010/0094529 A1 | 4/2010 | Gupta et al. |
| 2010/0094678 A1 | 4/2010 | Gupta et al. |
| 2010/0235215 A1 | 9/2010 | Hardy et al. |
| 2011/0010220 A1 | 1/2011 | Burnham et al. |
| 2011/0047212 A1 | 2/2011 | Levy et al. |
| 2011/0066468 A1 | 3/2011 | Huang et al. |
| 2011/0106573 A1 | 5/2011 | McNamara |
| 2011/0130958 A1 | 6/2011 | Stahl et al. |
| 2011/0257881 A1 | 10/2011 | Chen et al. |
| 2012/0075068 A1 | 3/2012 | Walker et al. |
| 2012/0078676 A1 | 3/2012 | Adams et al. |
| 2012/0095812 A1 | 4/2012 | Stetik et al. |
| 2012/0150580 A1 | 6/2012 | Norton |
| 2012/0179502 A1 | 7/2012 | Farooq et al. |
| 2013/0139193 A1 | 5/2013 | Fan et al. |
| 2013/0218982 A1 | 8/2013 | Hymel et al. |
| 2014/0278679 A1 | 9/2014 | Navani et al. |
| 2014/0343992 A1 | 11/2014 | Demerchant et al. |
| 2015/0006221 A1 | 1/2015 | Mermelstein |
| 2015/0193739 A1 | 7/2015 | Min et al. |
| 2015/0347983 A1 | 12/2015 | Jon et al. |
| 2016/0005289 A1* | 1/2016 | Ribble ................ A61B 5/6892 340/573.4 |
| 2016/0162674 A1* | 6/2016 | Friedman ............ G06F 21/32 340/5.52 |
| 2016/0162844 A1 | 6/2016 | Rachuri et al. |
| 2016/0180259 A1 | 6/2016 | Marianko et al. |
| 2016/0202678 A1* | 7/2016 | Aggarwal ........ G08B 13/19604 700/275 |
| 2016/0267439 A1 | 9/2016 | Bitran et al. |
| 2016/0307167 A1 | 10/2016 | Bathiya |
| 2017/0186113 A1 | 6/2017 | Shaw et al. |
| 2017/0357917 A1 | 12/2017 | Holmes et al. |
| 2018/0005194 A1 | 1/2018 | Dotan-Cohen et al. |
| 2018/0089410 A1 | 3/2018 | Case et al. |
| 2018/0253666 A1 | 9/2018 | Fix |
| 2018/0276576 A1 | 9/2018 | Blair et al. |
| 2018/0308067 A1 | 10/2018 | Pawar et al. |
| 2019/0130315 A1 | 5/2019 | Tokuchi |
| 2019/0139002 A1 | 5/2019 | Kumar et al. |
| 2019/0188619 A1 | 6/2019 | Chaturvedi et al. |
| 2019/0236554 A1* | 8/2019 | Hill ..................... G06Q 10/02 |
| 2019/0273627 A1 | 9/2019 | Whalin et al. |
| 2019/0295020 A1 | 9/2019 | Gupta et al. |
| 2020/0118045 A1 | 4/2020 | Chung et al. |
| 2020/0258051 A1 | 8/2020 | Ma |

OTHER PUBLICATIONS

Weksler et al., "Alteration of Data Associated with Electronic Calendar Based on Whether User is Actually Available", file history of related U.S. Appl. No. 15/010,284, filed Jan. 29, 2016.

Weksler et al., "Alteration of Data Associated with Electronic Calendar Based on Whether User is Actually Available", related U.S. Appl. No. 15/010,284, Non-Final Office Action dated May 29, 2020.

Weksler et al., "Alteration of Data Associated with Electronic Calendar Based on Whether User is Actually Available", related U.S. Appl. No. 15/010,284, Applicant's response to Non-Final Office Action filed Aug. 5, 2020.

Weksler et al., "Alteration of Data Associated with Electronic Calendar Based on Whether User is Actually Available", related U.S. Appl. No. 15/010,284, Final Office Action dated Oct. 20, 2020.

Ramirez Flores et al., "Systems and Methods to Extend Meetings Indicated in Electronic Calendars", related U.S. Appl. No. 16/370,294, Non-Final Office Action filed dated Nov. 18, 2020.

Lee et al., "Techniques for Detecting When Invitees are Present or Remote", file history of related application U.S. Appl. No. 16/544,275, filed Aug. 19, 2019.

Ramirez Flores et al., "Systems and Methods to Suggest Room Swap for Meeting", file history of related U.S. Appl. No. 16/370,378 filed Mar. 29, 2019.

Cruisecritic, "Declining an Upgrade", Mar. 2014-Apr. 2014, pp. 1-10, 2014.

Lee et al., "Techniques for Detecting When Invitees are Present or Remote", related U.S. Appl. No. 16/544,275, Applicant's response to Non-Final Office Action filed Apr. 13, 2021.

Lee et al., "Techniques for Detecting When Invitees are Present or Remote", related U.S. Appl. No. 16/544,275, Non-Final Office Action dated Feb. 18, 2021.

Ramirez Flores et al., "Systems and Methods to Extend Meetings Indicated in Electronic Calendars", related U.S. Appl. No. 16/370,294, Final Office Action filed dated Apr. 8, 2021.

Ramirez Flores et al., "Systems and Methods to Suggest Room Swap for Meeting", U.S. Appl. No. 16/370,378, Final Office Action dated Apr. 6, 2021.

* cited by examiner

SYSTEMS AND METHODS TO ELECTRONICALLY INDICATE WHETHER CONFERENCE ROOM IS IN USE BASED ON SENSOR INPUT

FIELD

The present application relates to technically inventive, non-routine solutions that are necessarily rooted in computer technology and that produce concrete technical improvements.

BACKGROUND

As recognized herein, an electronic reservation system might be used to reserve a conference room for a group of people, with the result being that others can access the reservation system to ascertain whether the conference room might be available for their own use. However, as also recognized herein, often times a conference room might be reserved via the reservation system yet not used as scheduled or a conference room might be in use without the reservation system reflecting such use. These circumstances can be frustrating and confusing while also waiting people's time. There are currently no adequate solutions to the foregoing computer-related, technological problem.

SUMMARY

Accordingly, in one aspect a first device includes at least one processor and storage accessible to the at least one processor. The storage includes instructions executable by the at least one processor to determine, based on input from at least one sensor, whether a conference room is in use. The instructions are also executable to, based on the determination, provide an electronic notification to a second device regarding whether the conference room is in use.

Thus, in some examples the instructions may be executable to determine that the conference room is in use based on the input from the at least one sensor and to provide the electronic notification to the second device based on the determination that the conference room is in use, with the electronic notification indicating that the conference room is currently in use. Also in some examples, the instructions may be executable to determine that the conference room is not in use based on the input from the at least one sensor and to provide the electronic notification to the second device based on the determination that the conference room is not in use, with the electronic notification indicating that the conference room is currently available for use.

In some examples, the at least one sensor may include at least one infrared (IR) proximity sensor, and the determination may be based at least in part on whether input from the at least one IR proximity sensor indicates movement in the conference room and/or indicates human presence in the conference room. Also, in some examples, the at least one sensor may include at least one camera, and the determination may be based at least in part on whether input from the at least one camera indicates presence of at least one person in the conference room. Still further, in some examples the at least one sensor may include at least one microphone, and the determination may be based at least in part on whether input from the at least one microphone indicates that at least one person is speaking.

As another example, the at least one sensor may include at least one communication element that communicates with a third device, and the determination may be based at least in part on whether input from the at least one communication element indicates presence of the third device within the conference room. Thus, the at least one communication element may include, e.g., plural wireless access points, and the determination may be based at least in part on whether the third device is triangulated to be within the conference room using input from the plural wireless access points. Additionally, or alternatively, the at least one communication element may include at least one Bluetooth communication element and/or at least one ultrasonic communication element, and the determination may be based at least in part on whether the third device is paired with another device that is within the conference room via the Bluetooth communication element and/or via the at least one ultrasonic communication element. As but one more example, the at least one communication element may include a telephone communication element that facilitates telephony communication and/or voice over Internet protocol communication, and the determination may be based at least in part on whether the telephone communication element is facilitating auditory communication.

Also note that in some embodiments, the first device may include the at least one sensor.

In another aspect, a method includes using an electronic device within a room to determine whether one or more people are present within the room. The method also includes indicating, via an electronic reservation system and based on the determination, whether the room is currently occupied.

In still another aspect, a computer readable storage medium that is not a transitory signal includes instructions executable by at least one processor. The instructions are executable to use an electronic device within a room to determine whether the room is currently being used for conferencing and to electronically indicate, based on the determination, whether the room is currently being used for conferencing.

The details of present principles, both as to their structure and operation, can best be understood in reference to the accompanying drawings, in which like reference numerals refer to like parts, and in which:

DETAILED DESCRIPTION

The present application discloses systems and methods for an electronic room reservation system and associated devices to book or release a room depending on whether the room is being used, as identified using various factors. An in-room device with built-in sensors, such as Lenovo's Hub 700, may be used to intelligently make and modify room reservations. For example, infrared proximity sensors may be used to detect movement and/or bodies/objects in the room. A camera may also be used to detect faces and/or bodies of people. Still further, a microphone may be used to detect discussion, and to even match that discussion to a meeting subject indicated in the electronic reservation system or a meeting participant's calendar entry for the meeting. Nearby wireless identifiers may also be used to determine if someone can be triangulated to be inside the room, while other technologies such as ultrasonic pairing and Bluetooth low energy pairing might also be used to return no connections or no paired connections specifically. Still further, the ending of a telephone call facilitated by the in-room device may be used to determine that a meeting has ended, as may remote meeting attendees that disconnect from a call facilitated by the in-room device (indicating, e.g., that some, most, or all local and/or remote users are no longer joining in the meeting).

For example, suppose a meeting ends early and all participants vacate the room. The in-room device may determine that no human presence is observed using one or more of its sensors, and then the device or the reservation system itself that communicates with the device may free the time on the calendar for others to use that particular room. Then, if desired, anyone wishing to book the room that has been vacated may be able to view an indicator icon on their own personal device that makes them aware that the meeting has ended early and that the in-room device believes the room to be available. A separate indicator icon might also be presented that informs that user when the organizer of the meeting confirms that the room has been vacated. Moreover, in some embodiments the meeting organizer may even be prompted by the in-room device (or their own personal mobile device) with, "Did this meeting end early?" to get the organizer's confirmation when the in-room device itself cannot confirm that the room is empty for whatever reason, either due to lack of sensors, broken/missing/unplugged sensors, etc., or simply to receive additional confirmation from the organizer himself or herself.

As another example, if a room is booked but no human presence is detected by the in-room device within the first few minutes of the scheduled start time of the meeting, the in-room device and/or the reservation system itself may notify other potential room-bookers that the room "might" be available for a different meeting but also that the room could be reserved or re-reserved at any time. In some embodiments, the meeting organizer may even be notified that their room will be released to others if at least a threshold number of people do not show up within a threshold time of the meeting start time (e.g., five to ten minutes). Further, in some embodiments when another user looks for a "last-minute" room, the original room organizer may be asked electronically if they will give up the room he or she reserved. This may be done responsive to the reserved room's in-room device detecting no human presence during a beginning portion of the timeslot for which the room was reserved.

With respect to any computer systems discussed herein, a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple Inc. of Cupertino Calif., Google Inc. of Mountain View, Calif., or Microsoft Corp. of Redmond, Wash. A Unix® or similar such as Linux® operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any general-purpose single- or multi-chip processor that can execute logic by means of various lines such as address lines, data lines, and control lines and registers and shift registers. Moreover, any logical blocks, modules, and circuits described herein can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can also be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may also be embodied in a non-transitory device that is being vended and/or provided that is not a transitory, propagating signal and/or a signal per se (such as a hard disk drive, CD ROM or Flash drive). The software code instructions may also be downloaded over the Internet. Accordingly, it is to be understood that although a software application for undertaking present principles may be vended with a device such as the system 100 described below, such an application may also be downloaded from a server to a device over a network such as the Internet.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library.

Logic when implemented in software, can be written in an appropriate language such as but not limited to C# or C++, and can be stored on or transmitted through a computer-readable storage medium (that is not a transitory, propagating signal per se) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., a game console such as XBOX®, and/or the system 100 may include a mobile communication device such as a mobile telephone, notebook computer, and/or other portable computerized device.

Figure 1:
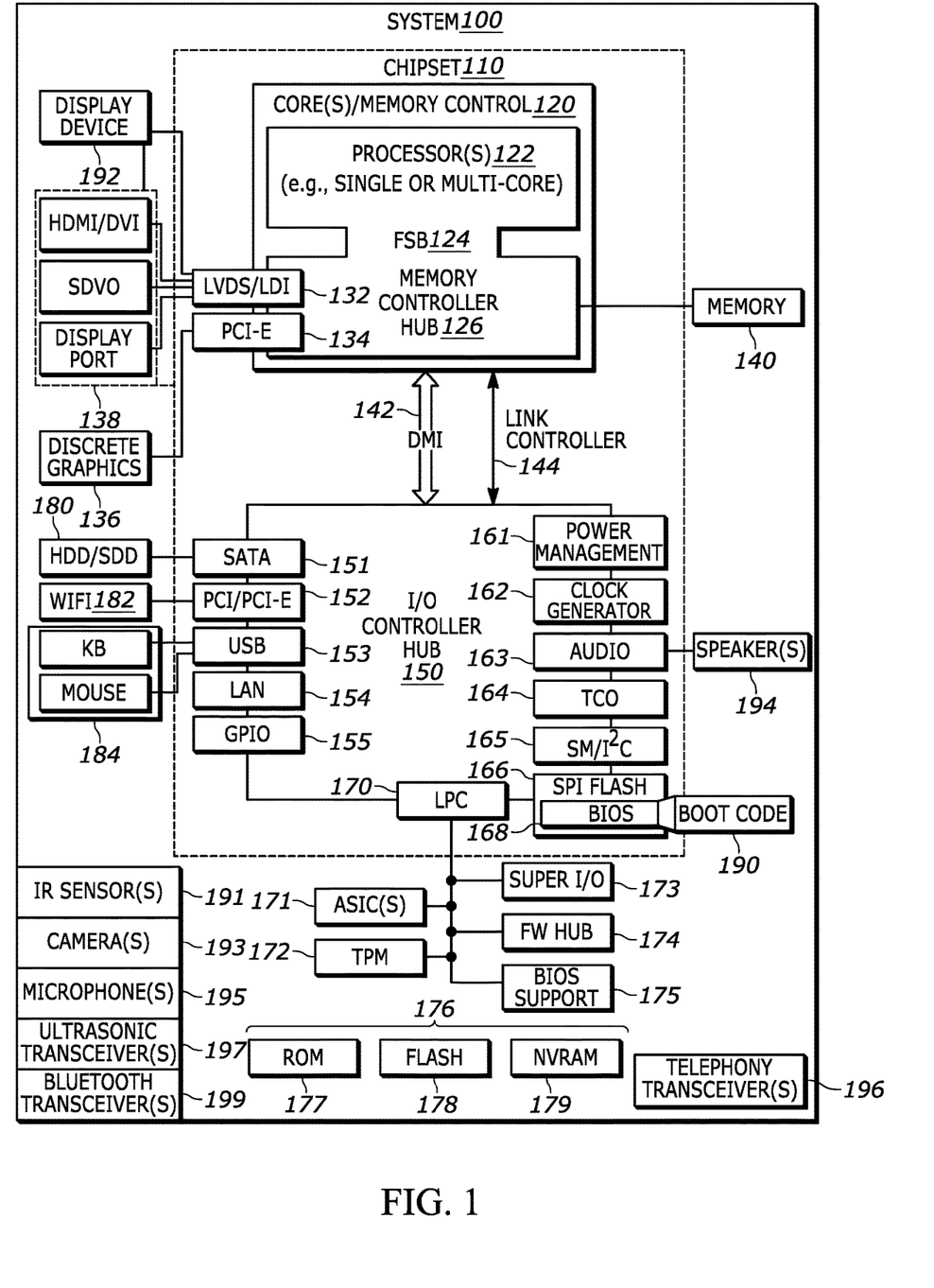
FIG. 1 is a block diagram of an example system in accordance with present principles.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled light emitting diode display or other video display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (×16) PCI-E port for an external PCI-E-based graphics card (including, e.g., one or more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case, the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

Additionally, the system 100 may include one or more sensors accessible to the one or more processors 122 so that input from the one or more sensors may be provided to the one or more processors 122. For example, the system 100 may include one or more infrared (IR) proximity sensors 191, one or more cameras 193, one or more microphones 195, one or more ultrasonic communication transceivers 197, and/or one or more Bluetooth communication transceivers 199. The cameras 193 may be, for example, thermal imaging cameras, infrared (IR) cameras, digital cameras such as webcams, three-dimensional (3D) cameras, and/or cameras otherwise integrated into the system 100 and controllable by the processor 122 to gather pictures/images and/or video. The ultrasonic communication transceivers 197 may be, for example, modulated-ultrasound transceivers. The one or more Bluetooth communication transceivers 199 may be classic Bluetooth transceivers and/or Bluetooth low energy (BLE) transceivers (e.g., Bluetooth 4.0 transceivers) for communicating with other devices using Bluetooth communication protocols.

Still further, a wireless telephony transceiver 196 may also be included in the system 100 as another example of a sensor in accordance with present principles. The telephony transceiver 196 may be a wired or wireless telephony transceiver, such as a wireless cellular telephone transceiver for wireless cellular communication over a cellular telephone network as well as other telephone networks.

Additionally, though not shown for simplicity, in some embodiments the system 100 may include other sensors such as a gyroscope that senses and/or measures the orientation of the system 100 and provides input related thereto to the processor 122, as well as an accelerometer that senses acceleration and/or movement of the system 100 and provides input related thereto to the processor 122. Also, the system 100 may include a GPS transceiver (another example of a sensor in accordance with present principles) that is configured to communicate with at least one satellite to receive/identify geographic position information and provide the geographic position information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
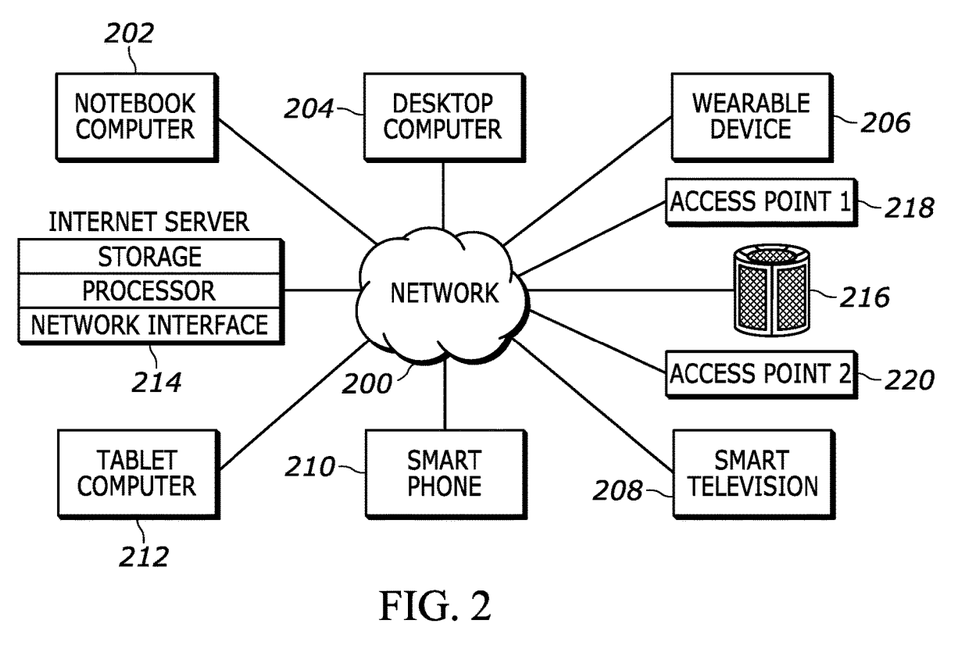
FIG. 2 is a block diagram of an example network of devices in accordance with present principles.

Turning now to FIG. 2, example devices are shown communicating over a network 200 such as the Internet in accordance with present principles. It is to be understood that each of the devices described in reference to FIG. 2 may include at least some of the features, components, and/or elements of the system 100 described above. Indeed, any of the devices disclosed herein may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, a conferencing hub device 216, and one or more Internet/Wi-Fi access points 218-220. FIG. 2 also shows a server 214 such as an Internet server that may provide cloud storage accessible to the devices 202-212, 216-220 and that may also execute and manage an electronic reservation system/software in accordance with present principles. It is to be understood that the devices 202-220 are configured to communicate with each other over the network 200 to undertake present principles. Moreover, some or all of the devices 202-220 may be, for example, located within a same conference room as each other.

The access points 218, 220 may be established by, for example, Wi-Fi access points, Wi-Fi routers, and/or Internet modems, etc. As for the conferencing hub device 216, it may be, for example, an IP conference phone, a Lenovo ThinkSmart Hub 500, and/or a Lenovo ThinkSmart Hub 700 that communicates with the server 214 that operates the electronic reservation system/software. Furthermore, the conferencing hub device 216 may include, for example, one or more processors, one or more of the sensors described herein, one or more touch-enabled displays, one or more storage areas, a keypad for telephone dialing, a microphone for receiving audio of call participants, a speaker for providing audio from call participants, etc.

Figure 3:
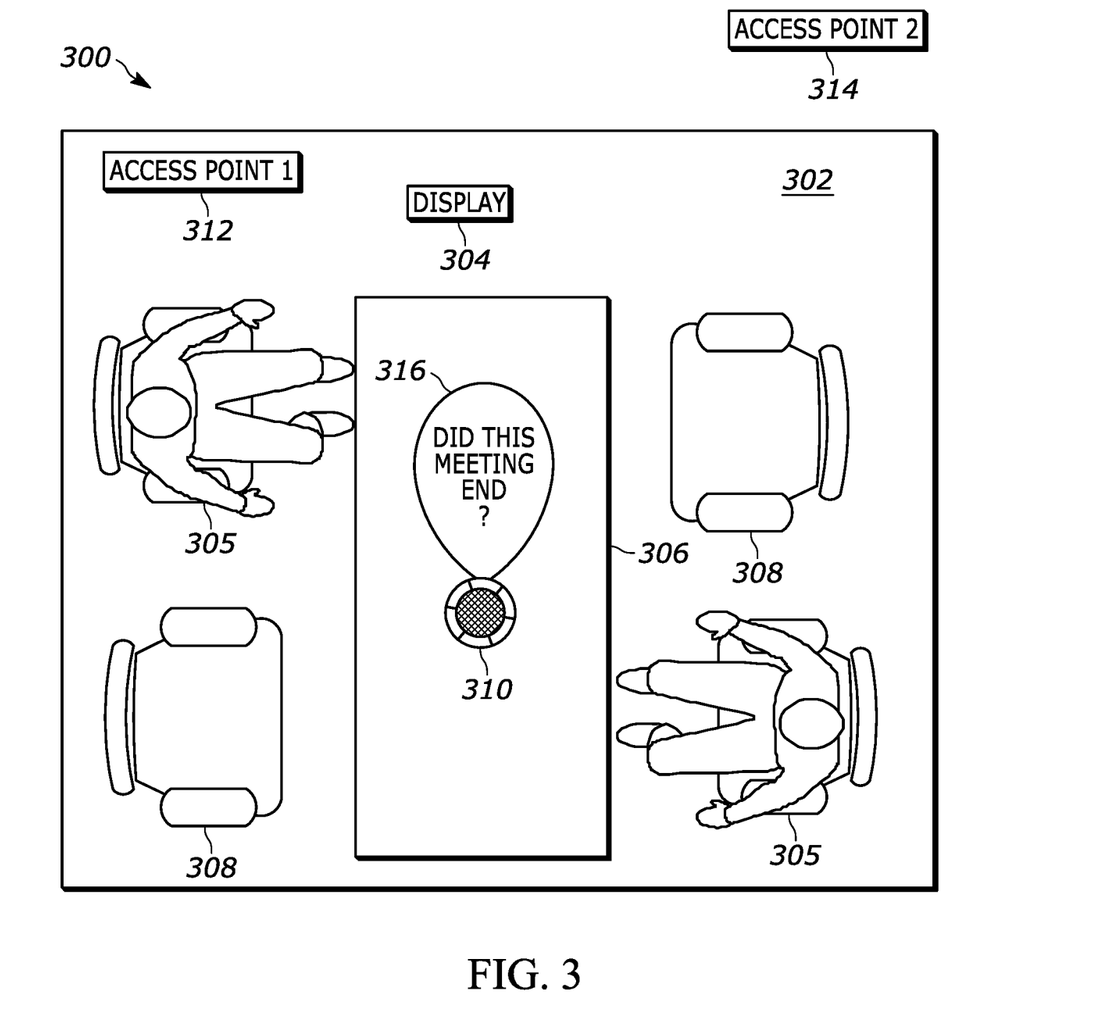
FIG. 3 is an example illustration of a conference room setting in accordance with present principles.

Now in reference to FIG. 3, it shows an example illustration 300 of a conference room 302. Disposed within the conference room 302 are a display 304 for conferees 305 to share visual content from their respective devices, a conference table 306, conference chairs 308, and a conferencing hub device 310 that may be similar in function and configuration to the conferencing hub device 216. For example, the conferencing hub device 310 may have one or more sensors for sensing the presence of any people that might be disposed within the room 302, such as the conferees 305. E.g., the conferencing hub device 310 may have one or more IR proximity sensors or cameras for sensing the presence of people within the room 302.

FIG. 3 also shows two access points 312, 314, with access point 312 being a router disposed within the room 302 in this example and with access point 314 being another router disposed outside of the room 302 in this example. The access points 312, 314 may be used to triangulate the location of a user's device as set forth further below so that the hub 310 or another device may determine whether the room 302 is being used, with the hub 310 or other device assuming in this example that if a user's device is triangulated to be within the room 302 then at least one person is using the room 302.

It is to be understood that in the example depicted in FIG. 3, one or more remote conferees (not shown) that called in to the conference taking place in the room 302 without being physically present in the room 302 have now hung up on the call or otherwise ended remote conferencing from wherever the remote conferees are located. Owing to the hub 310 facilitating audio and possibly even video conferencing between the conferees 305 and remote conferees, responsive to detecting this action the hub 310 may provide an audible prompt 316. The prompt may ask one or more of the in-person conferees 305 whether the conference has ended. In response, one or more of the in-person conferees 305 may provide audible input detected by a microphone on or in communication with the hub 310. The hub 310 or another device in communication with it may then execute speech recognition software to process the input to identify a response by one or more of the conferees 310.

For example, if the hub 310 identifies that one of the conferees 305 has responded that their conference has ended, then the hub 310 may update the electronic reservation system that was initially used to reserve the room 302 to now indicate that the room 302 is available for someone else to book it for a different conference. However, if the hub 310 identifies that one or more of the conferees 305 has responded that their conference has not ended, then the hub 310 may continue to indicate the room 302 as occupied/in use in the electronic reservation system.

Further, if none of the in-person conferees 305 provides a response to the prompt 316, the hub 310 may automatically update the electronic reservation system to now indicate that the room 302 is available for someone else to book it for a different conference. Alternatively, if none of the in-person conferees 305 provides a response, the hub 310 may use input from one or more sensors as described herein to determine whether any conferees 305 are still present in the room 302 and either continue to indicate the room 302 as occupied in the electronic reservation system (if one or more conferees 305 are detected as still being present) or update the electronic reservation system to indicate the room 302 as unoccupied (if one or more conferees 305 are not detected as still being present).

Figure 4:
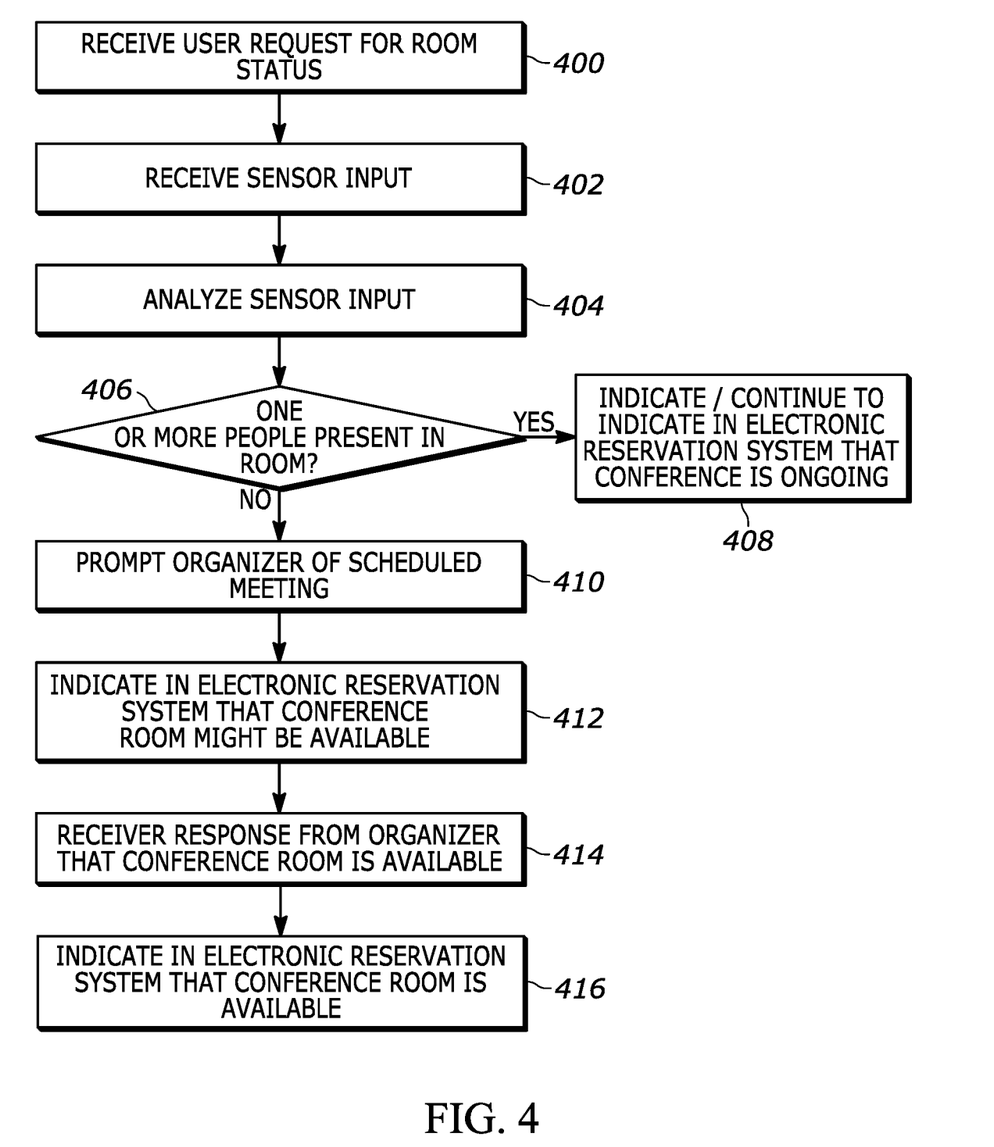
FIG. 4 is a flow chart of an example overall algorithm in accordance with present principles.

Referring now to FIG. 4, it shows example logic that may be executed by a device such as the system 100, the server 214, and/or a conferencing hub device in accordance with present principles. Beginning at block 400, the device may receive a user request to be informed on the status of whether a conference room is occupied or available. From block 400 the logic may then proceed to block 402 where the device may receive input from one or more sensors in accordance with present principles. Thereafter the logic may move to block 404 where the device may analyze the sensor input to determine at decision diamond 406 whether one or more people are present in the room for which occupation status is being determined. Specific sensor inputs that might be used, and determinations that might be made based on them at diamond 406, will be described in further detail below in reference to FIGS. 5-10.

Still referring to FIG. 4, an affirmative determination at diamond 406 may cause the logic to proceed to block 408 where the device may indicate or continue to indicate, via an electronic reservation system software module that controls reservation status for the room, that a conference in the room is ongoing. However, a negative determination at diamond 406 may instead cause the logic to proceed to block 410 or, in other examples, directly to block 412 as will be described further below.

First describing block 410, at this step the device may prompt an organizer of the conference that was scheduled for the room to confirm whether the conference is still ongoing. One example prompt that may be provided at block 410 was described above in reference to the prompt 316 (e.g., an audible prompt), and another example prompt that may be provided at block 410 will be discussed below in reference to FIG. 12 (e.g., a visual prompt). The logic may then proceed to block 412.

At block 412 the device may indicate, in the electronic reservation system, that the room might be available at the current time for use by other people. This may be done via the device providing an electronic notification to the electronic reservation system itself that the room might be available, and/or providing an electronic notification that the room might be available to the personal devices of any people that might be logged in to a web-based or closed-circuit portal for viewing room reservations and availabilities through the electronic reservation system.

From block 412 the logic may proceed to block 414, or directly to block 416 in other examples. First describing block 414, at this step the device may receive a response from an organizer of the conference that the conference has ended and/or that the room is otherwise available. One example response was described above in reference to FIG. 3 and the audible input received from one of the conferees 305, while another example response will be described below in reference to FIG. 12.

From block 414 the logic may then proceed to block 416. At block 416 the device may indicate in the electronic reservation system that the conference room is available and/or has been confirmed as available. This may be done via the device providing an electronic notification to the electronic reservation system and/or to the personal devices described above that the room is in fact available.

The flow charts of FIGS. 5-10 will be described next. It is to be understood that the example logic shown in these figures may be executed by a device such as the system 100, the server 214, and/or a conferencing hub device disposed within a room in accordance with present principles.

It is to be further understood that the logic shown in FIGS. 5-10 may be executed in conjunction with the logic of FIG. 4. For example, the sensor inputs received at the beginning blocks of each of FIGS. 5-10 may establish one of the sensor inputs that may be received at block 402, while the decision diamonds that are also shown in FIGS. 5-10 may establish one of the decisions that may be made at decision diamond 406.

Figure 5:
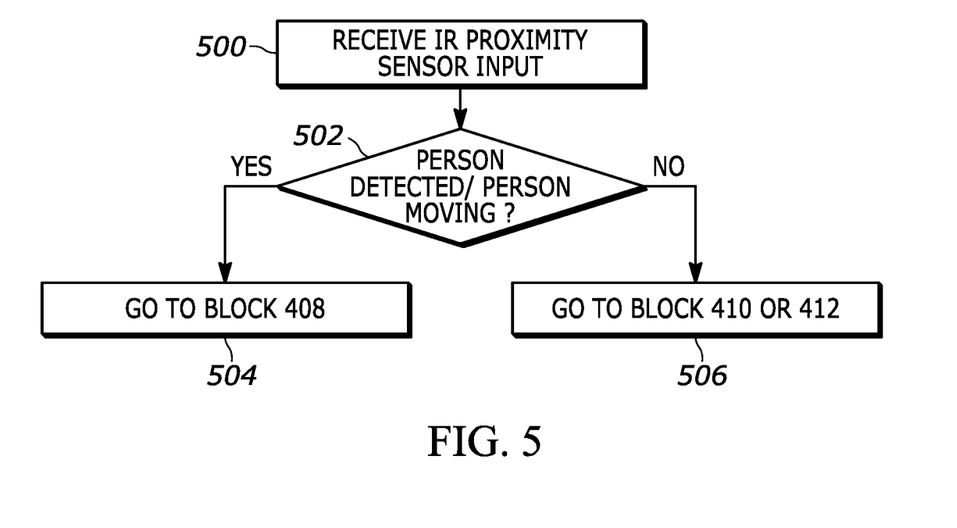
FIGS. 5-10 are flow charts reflecting respective algorithms for the processing of various sensor inputs that are disclosed herein, with those algorithms being usable in conjunction with the overall logic of FIG. 4.

Referring first to FIG. 5, infrared (IR) proximity sensor input may be received at block 500. Then at decision diamond 502 the device may determine, based on the IR proximity sensor input received at block 500, whether movement is detected in the room and/or whether a person is otherwise detected as present. The decision at diamond 502 may be performed by analyzing the IR proximity sensor input using motion detection software and/or object recognition software. Responsive to an affirmative determination at diamond 502, the logic may proceed to block 504 where device may go to block 408 of FIG. 4 and proceed therefrom. However, responsive to a negative determination at diamond 502, the logic may instead proceed to block 506 where the device may go to block 410 or 412 of FIG. 4 and proceed therefrom.

Figure 6:
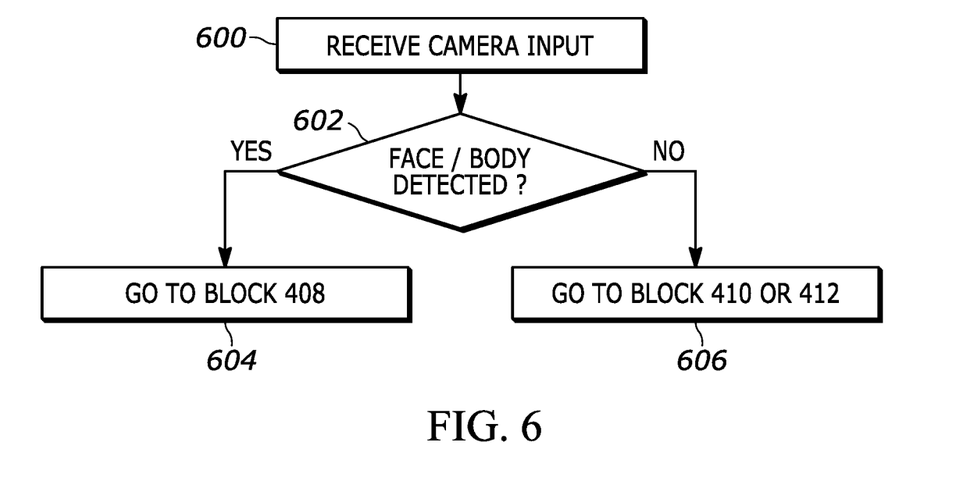

Now describing FIG. 6, input from a camera on the hub device or from a camera otherwise in communication with the hub device (e.g., mounted elsewhere in the room) may be received at block 600. Then at decision diamond 602 the device may determine, based on the camera input received at block 600, whether a person's face or body has been detected within the camera's field of view and hence within in the room. Note that a determination regarding whether movement has been detected based on the camera input may also be performed at diamond 602 in some examples, since movement may also indicate presence of a person. In any case, the decision at diamond 602 may be performed by analyzing the camera input using facial recognition software and/or object recognition software. Responsive to an affirmative determination at diamond 602, the logic may proceed to block 604 where device may go to block 408 of FIG. 4 and proceed therefrom. However, responsive to a negative determination at diamond 602, the logic may instead proceed to block 606 where the device may go to block 410 or 412 of FIG. 4 and proceed therefrom.

Figure 7:
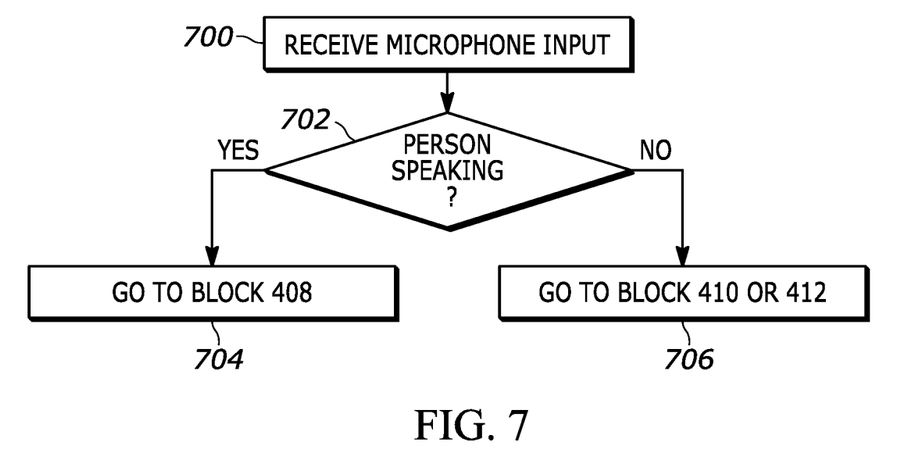

For FIG. 7, at block 700 microphone input may be received. Then at decision diamond 702 the device may determine, based on the microphone input received at block 700, whether a person has been detected as speaking. In some embodiments, the decision made at diamond 702 may even be that one or more conferees are specifically speaking about a subject that matches a subject associated with the conference in the electronic reservation system and/or that matches a subject indicated in one or more of the conferee's own electronic calendar entries for the conference, as may be determined using key word recognition.

The decision at diamond 702 may itself be performed by analyzing the microphone input using voice/speech recognition software. Then, responsive to an affirmative determination at diamond 702, the logic may proceed to block 704 where device may go to block 408 of FIG. 4 and proceed therefrom. However, responsive to a negative determination at diamond 702, the logic may instead proceed to block 706 where the device may go to block 410 or 412 of FIG. 4 and proceed therefrom.

Figure 8:
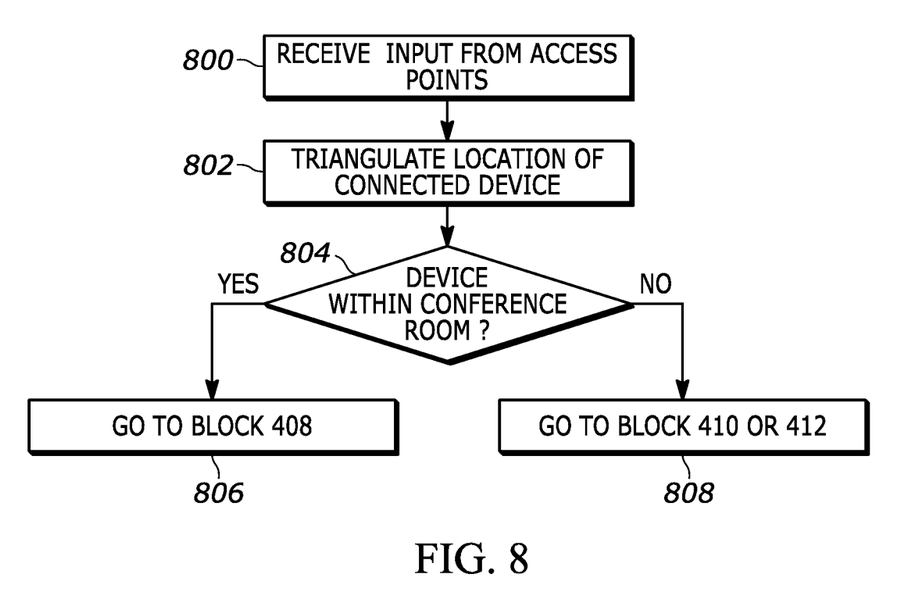

Referring now to FIG. 8, input (e.g., communications) from plural access points may be received at block 800. For example, input/communications may be received from two access points located at different locations, and the input/communications may be received via Wi-Fi or another wireless protocol. The inputs received from the respective access points may themselves indicate angles or directions to another device with which the respective access point is communicating, as detected by the respective access points. The logic may then move to block 802 where the device may triangulate the location of the other device in the room that communicated with the access points, with the triangulation using the known locations of the access points themselves (e.g., established by a system administrator) to identify the location of the other device.

The logic of FIG. 8 may then move to decision diamond 804 where, based on the triangulation and based on a defined location/area for the room itself (e.g., also established by a system administrator), the hub device may determine whether the identified location for the other device corresponds to a location within the room. In this example, it is assumed that triangulation of another device within the room indicates presence of a person within the room that is associated with that device. Thus, responsive to an affirmative determination at diamond 804, the logic may proceed to block 806 where device may go to block 408 of FIG. 4 and proceed therefrom. However, responsive to a negative determination at diamond 804, the logic may instead proceed to block 808 where the device may go to block 410 or 412 of FIG. 4 and proceed therefrom.

Figure 9:
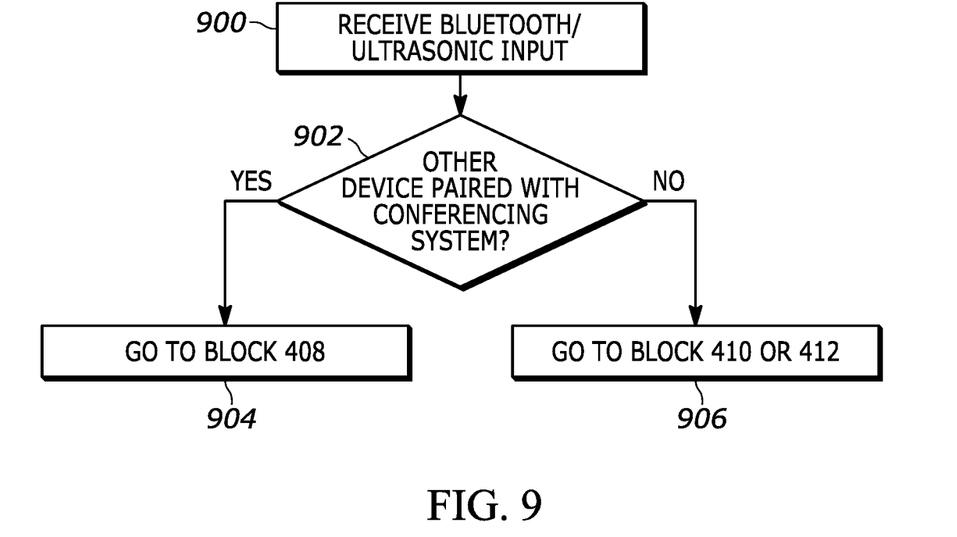

Describing FIG. 9, Bluetooth and/or ultrasonic input (e.g., communications) from another device may be received at block 900 via a Bluetooth/ultrasonic communication element disposed on the hub device, and then the hub device may establish paired Bluetooth/ultrasonic communication with that other device if the other device is in fact present within the room. Then at decision diamond 902 the device may determine, based on the input received at block 900, whether paired communication has actually been established. In this example, it is assumed that the establishment of paired communication by the hub device with another device via Bluetooth or ultrasonic communication indicates presence of the other device within the room, and hence indicates presence of a person within the room that is associated with the other device. Responsive to an affirmative determination at diamond 902, the logic may proceed to block 904 where device may go to block 408 of FIG. 4 and proceed therefrom. However, responsive to a negative determination at diamond 902, the logic may instead proceed to block 906 where the device may go to block 410 or 412 of FIG. 4 and proceed therefrom.

Figure 10:
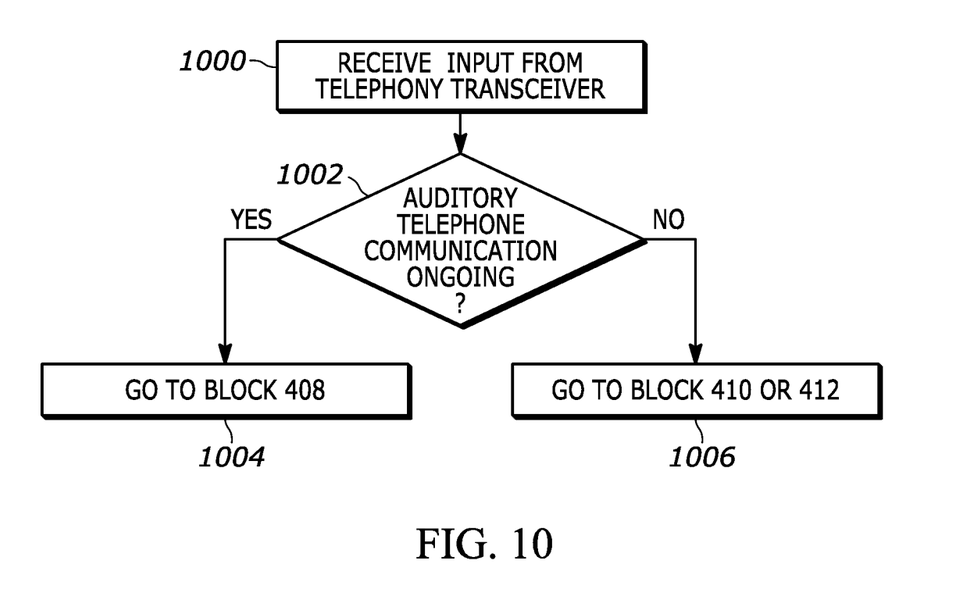

Regarding FIG. 10, telephony input (e.g., communications) may be received at block 1000 via at least one telephone communication element on the hub device. In many instances, the telephone communication element may in fact be a Wi-Fi or other network transceiver (e.g., like the interface 154 described above) that facilitates voice over Internet protocol (VoIP) communication with one or more other devices external to the room in which the hub device is disposed. In other instances, the telephone communication element may be a telephony transceiver that facilitates wireless cellular and/or public switched telephone network (PSTN) communication with one or more other devices external to the room in which the hub device is disposed.

Then at decision diamond 1002 the device may determine, based on the input received at block 1000, whether the telephone communication element is in fact facilitating auditory communication or whether the input simply indicates that no telephone/VoIP communication is ongoing. In this example, it is assumed that facilitation of auditory communication by the hub device with another device indicates presence of a person within the room.

Furthermore, in some examples the decision executed at diamond 1002 may specifically relate to whether a conference call as a whole has ended that was being facilitated at least in part by the hub device, and/or whether one or more people that called in to the conference have hung up or otherwise disconnected from the call at their own respective personal device.

Responsive to an affirmative determination at diamond 1002, the logic may proceed to block 1004 where device may go to block 408 of FIG. 4 and proceed therefrom. However, responsive to a negative determination at diamond 1002, the logic may instead proceed to block 1006 where the device may go to block 410 or 412 of FIG. 4 and proceed therefrom.

Figure 11:
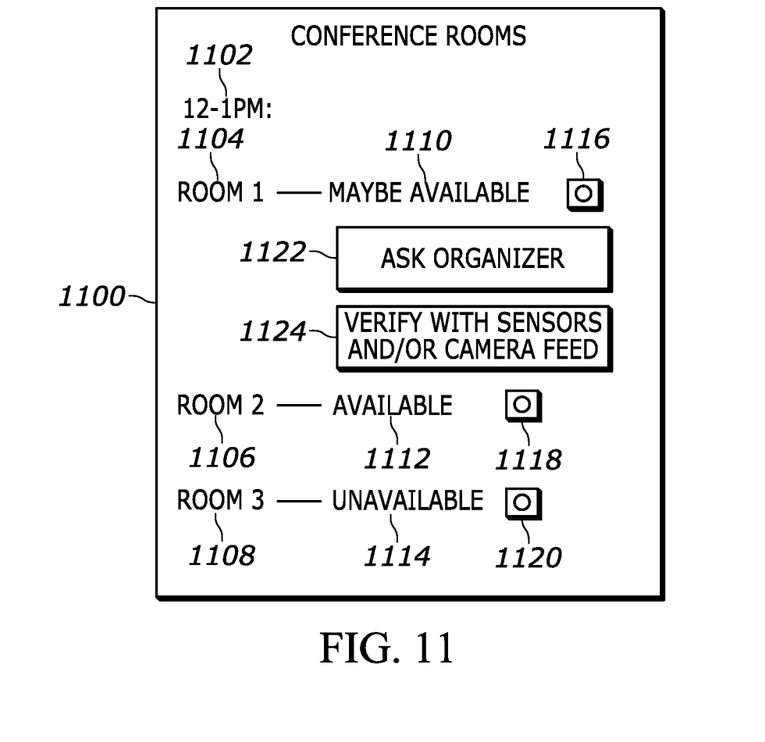
FIGS. 11-13 show example graphical user interfaces (GUIs) that may be presented in accordance with present principles.

Continuing the detailed description in reference to FIG. 11, this figure shows a graphical user interface (GUI) 1100 that may be presented on the display of a device having access to the electronic reservation system described herein to determine conference room availability. For example, the GUI 1100 may be presented via a user's laptop computer or smartphone to determine the availability of one or more conference rooms that each have their own hub device operating in accordance with present principles to report room availability.

It may be appreciated from FIG. 11 that the GUI 1100 may indicate a timeslot 1102 for which room availabilities are being presented. The GUI 1100 may also indicate plural rooms 1104-1108. Each room indication 1104-1108 may be accompanied by a respective indicator 1110-1114 that indicates via text whether the associated room is available. As may be appreciated from FIG. 11, indicator 1110 indicates that "Room 1" may be available, indicator 1112 indicates that "Room 2" is in fact available, and indicator 1114 indicates that "Room 3" is unavailable.

Still further, differently-color stoplight icons 1116-1120 for each respective room may also be presented on the GUI 1100 to indicate room availability. For example, the icon 1116 may be presented as a yellow-colored traffic light to indicate that "Room 1" may be available (e.g., but that the system is still awaiting confirmation from a conference organizer). Also note that the icon 1118 may be presented as a green-colored traffic light to indicate that "Room 2" is available, while the icon 1120 may be presented as a red-colored traffic light to indicate that "Room 3" is not available.

Still further, FIG. 11 shows that the entry for "Room 1" may also be accompanied by selectors 1122 and 1124. Selector 1122 may be selectable to provide a command to the electronic reservation system to prompt an organizer of a conference that had reserved "Room 1" for the timeslot 1102 regarding whether the conference is in fact currently taking place or if the room is actually available for other use. Selector 1124 may be selectable to provide a command to the electronic reservation system to activate one or more sensors on a hub device located within "Room 1", and/or other sensors within "Room 1" that are located elsewhere within the room but still in communication with the hub device within "Room 1", so that this hub device may report back to the electronic reservation system regarding whether "Room 1" is in fact currently being used or whether it might be available for a different meeting.

The electronic reservation system may then update the entry for "Room 1" on the GUI 1100 depending on a response from the organizer and/or the report from the hub device in "Room 1". This may be done at least by updating the indicator 1110 to reflect that the room is in fact available or unavailable, and/or by updating the icon 1116 to either be a green or red-colored traffic light depending on whether the room is available.

Thus, it may be more generally appreciated that that both the indications 1110-1114 and icons 1116-1120 may be dynamically presented and updated on the GUI 1100 based on whether a respective hub device located in that room indicates the current presence of one or more people.

Figure 12:
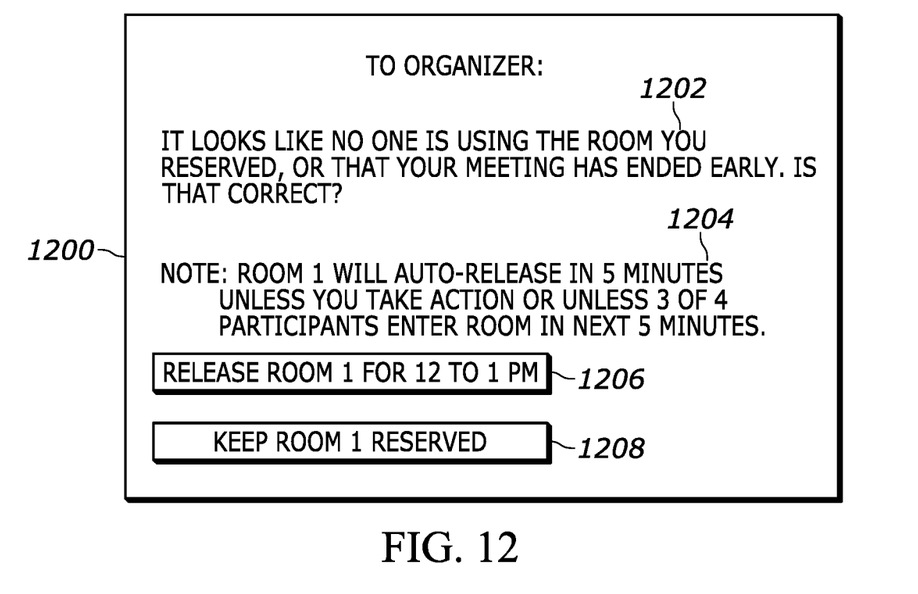

FIG. 12 shows an example prompt that may be presented on a personal device of a conference organizer as part of a GUI 1200 to confirm whether a conference room that the organizer has reserved for a given timeslot is in fact being used for a conference. Thus, selection of the selector 1122 from the GUI 1100 as presented at one user's device may command the electronic reservation system to prompt the organizer at another device controlled by the organizer via prompt GUI 1200.

As may be appreciated from FIG. 12, the prompt may include example text 1202 indicating the following: "It looks like no one is using the room you reserved, or that your meeting has ended early. Is that correct?"

Even further, the GUI 1200 may include still other text indicating an action the electronic reservation system may take depending on whether the organizer responds or whether another condition occurs. For example, example text 1204 indicates that Room 1 will be automatically made available for other people to reserve it after expiration of a threshold time of five minutes, unless the meeting organizer takes action to indicate he or she is still using or plans to use Room 1 during the reserved timeslot. The example text 1204 may also indicate that Room 1 will be automatically made available for other people to reserve it unless a threshold amount of all designated participants for the organizer's conference enter Room 1 within a threshold time of five minutes, as may be detected by a hub device located within Room 1 using one or more of the presence detection processes disclosed herein.

The meeting organizer may provide a response to the prompt, also via the GUI 1200. For example, a selector 1206 may be presented that may be selectable to provide input to the electronic reservation system that the organizer no longer plans to use Room 1 for a conference and hence that Room 1 may be released for other people to reserve it during the given time slot. A selector 1208 may also be presented that may be selectable to provide input to the electronic reservation system that the organizer does still plan to use Room 1 for a conference or is in fact already using Room 1 for a conference, and hence that Room 1 should not be released for other people to reserve it during the given time slot.

Figure 13:
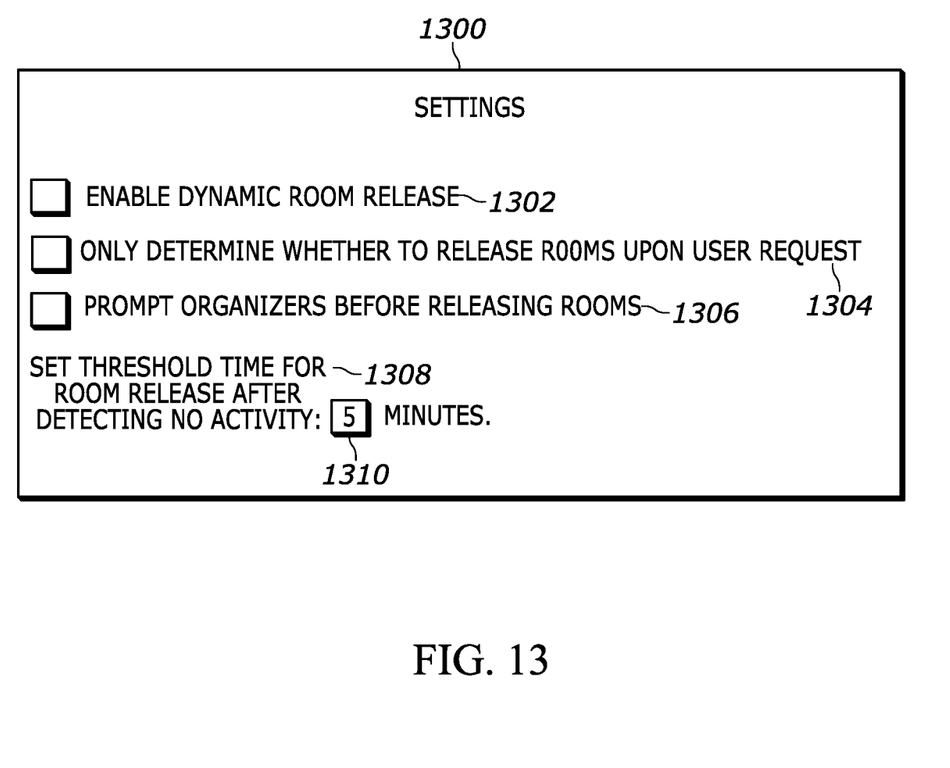

FIG. 13 shows a settings GUI 1300 that may be presented on a display in accordance with present principles. The GUI 1300 may be presented, e.g., on the display of a system administrator's device or the device of another user that manages the electronic reservation system. It is to be understood that each option that will be described below in reference to FIG. 13 may be selected by selecting the respective check box shown adjacent to the respective option, e.g., via touch input directed to the display location at which the respective check box is presented.

In the example shown, the GUI 1300 may include a first option 1302 that is selectable to enable dynamic room release in accordance with present principles. For instance, the option 1302 may be selected to enable the electronic reservation system and/or hub devices disclosed herein to undertake the steps and actions set forth above in reference to FIGS. 3-12.

The GUI 1300 may also include an option 1304 that may be selectable to set or configure the electronic reservation system to only use respective hub devices to determine human presence/room use upon a user request. In doing so, constant use of hub device sensors to detect conferee presence may be avoided so that, e.g., sensor life may be extended, battery life may be preserved if the hub device is operating on battery power rather than wall outlet power, or simply to provide a "green" option for power conservation.

Still in reference to FIG. 13, the GUI 1300 may also include an option 1306 that is selectable to configure or set the device to prompt meeting organizers before making rooms the organizers had reserved available for other use. Thus, selection of option 1306 may configure hub devices and/or the electronic reservation system to execute blocks 410 and 414 of FIG. 4, whereas option 1306 not being selected may cause the hub devices and/or electronic reservation system to skip blocks 410 and 414 when executing the logic of FIG. 4.

The GUI 1300 may also include a setting 1308 for configuration of a threshold time for making a reserved room available again for a given timeslot if no activity or conferee presence is detected within the reserved room for the threshold time. Thus, a user may direct numerical input to input box 1310 to establish the threshold time.

Moving on from the description of FIG. 13, it is to be understood in accordance with present principles that a coordinating server may operate the electronic reservation system itself and may communicate with one or more hub devices in respective rooms for undertaking the functions set forth herein. Thus, for example, while the hub device may execute some or all of the steps disclosed above in reference to FIGS. 4-10, a server may also communicate with the hub device to execute some of the steps disclosed in those figures as well.

E.g., the hub device may receive camera or microphone input and transmit that input to the server for the server to then perform facial recognition or voice recognition, respectively. The server may then transmit the result back to the hub device for further processing or may itself prompt a meeting organizer regarding room availability as disclosed herein (while also continuing to operate and manage the electronic reservation system itself).

Still further, present principles recognize that global positioning system (GPS) transceivers may also be used as sensors in accordance with present principles. For example, an in-room hub device or coordinating server may receive GPS coordinates from respective personal devices of respective meeting attendees and then compare those coordinates to known coordinates for a room in which the attendees are to meet at a designated time for their meeting. Responsive to determining that there is overlap between the GPS coordinates for one or more of the personal devices with the GPS coordinates for the room itself, the in-room hub device and/or server may determine that one or more people are present in the room during the scheduled meeting time. However, responsive to determining that there is no overlap in GPS coordinates, the in-room hub device and/or server may determine that one or more people are not present in the room during the scheduled meeting time.

Present principles also recognize that a person seeking any conference room managed by the system that might become available, or seeking a particular conference room managed by the system that might become available, may select a selector presented as part of a GUI for the system that is presented at that user's device (e.g., a GUI similar to the GUI 1100). This selector may be selectable to command the electronic reservation system to, upon one or more of the determinations described herein for determining human presence, notify that user via an audible or visual prompt on his or her personal device that a room (or the specifically-requested room) has become available.

It is to be understood that while many of the figures disclosed herein illustrate logic in flow chart format, state logic or other equivalent logic may be used.

It may now be appreciated that the present application provides for an improved computer-based user interface that improves the functionality and ease of use of the devices and electronic reservation system(s) disclosed herein. The disclosed concepts are thus rooted in computer technology for computers to carry out their functions.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. A first device, comprising:
at least one processor; and
storage accessible to the at least one processor and comprising instructions executable by the at least one processor to:
determine, based on input from at least one sensor, whether a conference room is in use; and
based on the determination, provide an electronic notification to a second device regarding whether the conference room is in use, the second device associated with a human organizer of a conference for which the conference room was in use, the electronic notification indicating text asking whether the conference room is still in use, the electronic notification comprising at least one selector that is selectable by the human organizer to provide input indicating whether the conference room is actually available during at least part of a previously-scheduled time for the conference.

2. The first device of claim 1, wherein the instructions are executable by the at least one processor to:
determine, based on the input from the at least one sensor, that the conference room is not in use; and
based on the determination that the conference room is not in use, provide the electronic notification to the second device.

3. The first device of claim 1, wherein the at least one sensor comprises at least one microphone, and wherein the instructions are executable to:
determine, based on input from the at least one microphone, whether a person has been detected as speaking about something that matches a subject for the conference as indicated in an electronic system; and
responsive to determining that the person has been detected as speaking about something that matches the subject, determine that the conference room is in use.

4. The first device of claim 1, wherein the second device is a personal mobile device of the human organizer.

5. The first device of claim 1, wherein the instructions are executable to:
receive a response to the electronic notification; and
responsive to receiving the response, either release the conference room for additional conference bookings or continue to indicate in an electronic reservation system that the conference room is still in use.

6. The first device of claim 1, wherein electronic notification as presented at the second device comprises the text, a first selector that is selectable to indicate that the conference room is still in use, and a second selector that is selectable to indicate that the conference room is not still in use, the second selector being different from the first selector.

7. The first device of claim 1, wherein the electronic notification indicates that the conference room will be auto-released within a threshold period of time of a current time if the human organizer does not take action.

8. A method, comprising:
receiving, at a device, a request for a human organizer of a conference to provide input indicating whether a room already reserved for the conference is actually available during at least part of a time the room has been reserved for the conference; and
based on the receiving, presenting a graphical user interface (GUI) on an electronic display of the device, the GUI as presented on the electronic display comprising words asking a question related to whether the room is actually available during at least part of the time the room has been reserved for the conference by the human organizer, the GUI comprising at least one selector that is selectable for the human organizer to indicate whether the room is actually available during at least part of the time the room has been reserved for the conference.

9. The method of claim 8, wherein the method comprises:
receiving, via a microphone, an audible response to an audible prompt asking whether the room is still being used for the conference; and
indicating, via an electronic reservation system and based on the audible response, whether the room is still being used for the conference.

10. The method of claim 8, wherein the GUI as presented on the electronic display indicates via words that the room will be auto-released within a threshold period of time of a current time if the human organizer does not take action to indicate that the room is not actually available during at least part of the time the room has been reserved for the conference.

11. The method of claim 8, wherein the device is a first device, and wherein the method comprises:
   identifying, at a second device, the first device as being associated with the human organizer; and
   responsive to identifying at the second device that the first device is associated with the human organizer, transmitting the request to the first device.

12. The method of claim 8, wherein the device is a first device, and wherein the method comprises:
   determining, using a microphone, whether a person in the room has been detected as speaking about something that matches a subject of the conference as indicated in an electronic system storing data about the conference; and
   responsive to determining that the person has been detected as speaking about something that matches the subject of the conference, presenting one or more indications that the room is in use.

13. The method of claim 8, wherein the at least one selector comprises a first selector, wherein the first selector is selectable via the GUI to indicate that the room is actually available during at least part of the time the room has been reserved for the conference, and wherein the GUI comprises a second selector different from the first selector, the second selector being selectable via the GUI to indicate that the room is not actually available during at least part of the time the room has been reserved for the conference.

14. The method of claim 8, wherein the GUI is a first GUI, and wherein the method comprises:
   presenting a second GUI that indicates that the room may potentially be available but does not indicate that the room is definitively available and does not indicate that the room is definitively unavailable, the second GUI being different from the first GUI.

15. A computer readable storage medium (CRSM) that is not a transitory signal, the computer readable storage medium comprising instructions executable by at least one processor to:
   receive input from a first device, the input from the first device comprising a request for a human organizer of a meeting to provide input indicating whether a room reserved for the meeting is actually available during a previously-scheduled time for the meeting;
   present a prompt at a second device requesting the human organizer provide input indicating whether the room is actually available during the previously-scheduled time, the second device being a personal device associated with the human organizer, the second device being different from the first device, the prompt comprising at least one selector that is selectable by the human organizer to provide the input indicating whether the room is actually available during the previously-scheduled time;
   electronically indicate to the first device, based on receiving a response to the prompt, whether the room is currently being used for the meeting; and
   also indicate, via an electronic room reservation system and based on the response, whether the room is currently being used for the meeting, the electronic reservation system managed by at least one third device that is different from the first and second devices.

16. The CRSM of claim 15, wherein the at least one selector comprises a first selector, and wherein the input from the first device is generated based on selection of a second selector presented on a display accessible to the first device, the second selector being selectable to initiate the request.

17. The CRSM of claim 16, wherein the prompt is presented on a display accessible to the second device.

18. The CRSM of claim 15, wherein the prompt as presented at the second device indicates that the room will be auto-released within a threshold period of time of a current time if the human organizer does not take action to indicate that the room is not actually available during at least part of the previously-scheduled time.

19. The CRSM of claim 15, wherein the instructions are executable to:
   determine, using a microphone, whether a person in the room has been detected as speaking about something that matches a subject of the meeting as indicated in stored data about the conference; and
   responsive to a determination that the person has been detected as speaking about something that matches the subject of the meeting, present one or more indications at one or more devices that the room is in use.

20. The CRSM of claim 15, wherein the instructions are executable to:
   presenting an indication on an electronic display that indicates that the room may potentially be available during at least part of the previously-scheduled time but does not indicate that the room is definitively available during the part of the previously-scheduled time and does not indicate that the room is definitively unavailable during the part of the previously-scheduled time.

* * * * *